US 12,266,952 B2

(12) United States Patent
Brunet et al.

(10) Patent No.: US 12,266,952 B2
(45) Date of Patent: Apr. 1, 2025

(54) METHOD FOR REDUCING WEAR OF AN ENERGY STORAGE DEVICE

(71) Applicant: VOLVO TRUCK CORPORATION, Gothenburg (SE)

(72) Inventors: Simon Brunet, Landvetter (SE); Tommy Hjelle, Torslanda (SE); Martin Myhre, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/450,515

(22) Filed: Oct. 11, 2021

(65) Prior Publication Data
US 2022/0123561 A1 Apr. 21, 2022

(30) Foreign Application Priority Data
Oct. 15, 2020 (EP) .................................... 20202042

(51) Int. Cl.
*H02J 7/00* (2006.01)
*B60L 50/60* (2019.01)
*B60L 53/00* (2019.01)

(52) U.S. Cl.
CPC ............ *H02J 7/0013* (2013.01); *B60L 50/60* (2019.02); *H02J 7/0063* (2013.01)

(58) Field of Classification Search
CPC . H02J 7/0013–14; H02J 7/0063; B60L 50/00; B60L 50/60
USPC ....................................................... 307/10.1
See application file for complete search history.

(56) References Cited

U.S. PATENT DOCUMENTS

| 4,616,170 | A | 10/1986 | Urstoger |
| 10,232,728 | B2 | 3/2019 | Butzmann |
| 10,630,086 | B2 | 4/2020 | Hsu et al. |
| 10,710,468 | B2 | 7/2020 | Teng |
| 2003/0107352 | A1* | 6/2003 | Downer ................ B60L 58/20 322/40 |

(Continued)

FOREIGN PATENT DOCUMENTS

| CN | 102577018 A | 7/2012 |
| CN | 103858272 A | 6/2014 |

(Continued)

OTHER PUBLICATIONS

European Search Report dated Mar. 18, 2021 in corresponding European Patent Application No. 20202042.6, 7 pages.

(Continued)

*Primary Examiner* — Hal Kaplan
*Assistant Examiner* — Swarna N Chowdhuri
(74) *Attorney, Agent, or Firm* — Venable LLP; Jeffri A. Kaminski (57) ABSTRACT

The present invention relates to a method for reducing wear of an energy storage device in an energy storage system connected to a load, the energy storage system comprising at least two energy storage devices. The method comprising: connecting (S1) the energy storage system to an electrical energy source, and electrically powering (S2) the load via the energy storage system by connecting at least one of the energy storage devices to transfer electrical energy from the electrical energy source to the load, and disconnecting at least one other energy storage device to not transfer any electrical energy from the electrical energy source to the load.

20 Claims, 4 Drawing Sheets

(56) References Cited

U.S. PATENT DOCUMENTS

| | | | |
|---|---|---|---|
| 2011/0025125 A1* | 2/2011 | Brabec | H02J 7/0071 |
| | | | 307/9.1 |
| 2012/0326510 A1 | 12/2012 | Sadler | |
| 2012/0330488 A1 | 12/2012 | Sadler | |
| 2013/0334878 A1* | 12/2013 | Brabec | B60L 53/00 |
| | | | 307/9.1 |
| 2016/0114692 A1* | 4/2016 | Tripathi | B60L 58/21 |
| | | | 320/109 |
| 2017/0366019 A1 | 12/2017 | Sung et al. | |
| 2019/0160972 A1 | 5/2019 | Zeiler et al. | |
| 2021/0031645 A1* | 2/2021 | Reeves | B60L 50/64 |
| 2021/0197689 A1* | 7/2021 | Reimer | B60L 50/66 |
| 2022/0385080 A1* | 12/2022 | Bijlenga | H02J 7/0024 |

FOREIGN PATENT DOCUMENTS

| | | | |
|---|---|---|---|
| CN | 105383419 A | 3/2016 | |
| CN | 106143170 A | 11/2016 | |
| DE | 19625104 A1 | 1/1998 | |
| DE | 102016200086 A1 | 7/2017 | |
| EP | 1824703 A1 | 8/2007 | |
| EP | 2460254 A2 | 6/2012 | |
| EP | 3110652 A1 | 1/2017 | |
| EP | 3624301 A1 | 3/2020 | |
| WO | 2011014593 A2 | 2/2011 | |
| WO | 2011014593 A3 | 2/2011 | |
| WO | 2015124161 A1 | 8/2015 | |

OTHER PUBLICATIONS

Chinese Office Action dated Dec. 27, 2023 in corresponding Chinese Patent Application No. 202111175971.6, 22 pages.

European Communication pursuant to Article 94(3) EPC dated Jan. 22, 2025 in corresponding European Patent Application No. 20202042.6, 11 pages.

* cited by examiner

METHOD FOR REDUCING WEAR OF AN ENERGY STORAGE DEVICE

TECHNICAL FIELD

The present invention relates to a method for reducing wear of an energy storage device in an energy storage system. The invention further relates to a switching arrangement, a power conditioning arrangement, and to an electric vehicle.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage device is used to store the energy needed in order to propel the vehicle. Energy storage devices may further be used to power auxiliary loads in the vehicle.

For many vehicle, the energy storage devices are comprised in an energy storage system, wherein the energy storage system is configured to power and engine or machine for propelling the vehicle, as well as an auxiliary load. For example, for an electric vehicle the energy storage devices are typically batteries, which are configured to operate the electric machine as well as electrically driven auxiliary equipment. The batteries are periodically in need of charging, and is then electrically connected to an electrical energy source. One common solution to charge the batteries is by a plug connected to the electrical energy source, e.g. a power source such as a power grid, by an electrical wire or cable. Typically, the vehicle is parked in a parking/charging spot providing such charging means, and the driver or other person manually plug the charging means into a socket of the vehicle, the socket being in electrical communication with the energy storage system and the batteries enabling charging of the same. Another solution to charge the battery is by a wireless charging system utilizing a power emitting coil and a power receiving coil configured to receive emitted electromagnetic radiation from the power emitting coil.

During charging, or whenever the vehicle is electrically connected to an electrical energy source, an auxiliary load of the vehicle may be in need of powering. The auxiliary load may then be directly connected to the electrical energy source and operated by power from e.g. the power grid. However, when powering the auxiliary load in such a way, the system is not particularly robust to load changes.

SUMMARY

It is an object of the present disclosure to at least to some extent alleviate the shortcomings discussed above in relation to known energy storage systems, and to improve the operation of the energy storage devices.

According to at least a first aspect of the present invention, a method for reducing wear of an energy storage device in an energy storage system connected to a load, the energy storage system comprising at least two energy storage devices, is provided. The method comprising:

connecting the energy storage system to an electrical energy source, electrically powering the load via the energy storage system by connecting at least one of the energy storage devices to transfer electrical energy from the electrical energy source to the load, and disconnecting at least one other energy storage device to not transfer any electrical energy from the electrical energy source to the load.

Hereby, at least one energy storage device is not active during powering of the load, and is thus not subject to any wear, while the energy storage system provides stable conditions for powering the load as at least one of the energy storage devices is used as buffer or load buffer in the system. Thus, the wear of the energy storage device which is not active during powering of the load, is reduced. In other words, one, or at least one, energy storage device is connected or is active in powering the load, and one energy storage device is disconnected or inactive in powering the load, wherein the wear of the latter may be reduced. Stated differently: the electrical energy source is electrically powering the load via the energy storage system in such a way that at least one energy storage device is active, and at least one energy storage device is inactive. This provides for a robust system with regards to load changes, with a minimized wear of the energy storage devices. The wear which is reduced may e.g. be contactor wear.

It should be understood that at least one energy storage device which is active in powering the load, is used to provide an improved stability in the energy storage system (i.e. to function as a type of buffer or load buffer).

According to at least one example embodiment, the energy storage system comprises an energy source interface, which energy source interface is connectable to the electrical energy source and each one of the energy storage devices. Thus, during use, the energy source interface is active in connecting the electrical energy source with the energy storage devices (whichever is active and/or is charging). Additionality, or alternatively, the energy storage system comprises a load interface, which load interface is connectable to the load and each one of the energy storage devices. Thus, during use, the load interface is active in connecting the energy storage devices (whichever is active) with the load.

According to at least one example embodiment, the method comprises: alternately connecting and disconnecting the at least two energy storage devices.

Hereby, at least one of the energy storage devices will not be active, and thus not subject to any wear. That is, connecting at least a first energy storage device to transfer electrical energy from the energy source to the load, and disconnecting at least a second energy storage device to not transfer electrical energy from the energy source to the load, and subsequently alternating the connection/disconnection such that the first energy storage device is disconnected and the second energy storage device is connected. The step of alternately connecting and disconnecting the at least two energy storage devices may be performed during the step of electrically powering the load, or between two such steps of electrically powering the load.

According to at least one example embodiment, the energy storage system comprises a plurality of energy storage devices, the plurality being more than two, and the method further comprises: connecting the energy storage device which has been disconnected the longest time.

Hereby, the overall wear of the energy storage devices can be reduced in an effective manner. The wear may be related to the number of a times an energy storage device is connected, and it is thus efficient to ensure that each energy storage device is connected/disconnected the same number of times. For example, in an embodiment in which the energy storage system comprises three energy storage devices, at a first step of electrically powering the load, a first energy storage device is connected (i.e. is active) while a second and third energy storage devices are disconnected (i.e. are inactive); at a subsequent second step of electrically powering the load, the second energy storage device is connected (i.e. is active) while the first and third energy storage devices are disconnected (i.e. are inactive); at a subsequent third step of electrically powering the load, the third energy storage device is connected (i.e. is active) while the first and second energy storage devices are disconnected (i.e. are inactive); at a subsequent fourth step of electrically powering the load, the first energy storage device is again connected (i.e. is active) while the second and third energy storage devices are disconnected (i.e. are inactive); and so on. The term "connecting the energy storage device which has been disconnected the longest time" may alternatively be phrased as "connecting the energy storage device which was connected the longest time ago". Stated differently, for the plurality of energy storage devices, the method comprises subsequently connecting and disconnecting the energy storage devices according to a scheme in which the energy storage that was first connected, is reconnected once the all of the energy storage devices have been connected one time.

According to at least one example embodiment, the method comprises: cycling the energy storage devices in the energy storage system in such a way that over time, each energy storage device is connected for transferring electrical energy from the electrical energy source to the load roughly the same amount of time.

Hereby, the overall wear of the energy storage devices can be reduced in an effective manner. For a specific or individual energy storage device, the wear may be related to the elapsed time which said energy storage device has been connected, and it is thus efficient to ensure that each energy storage device is connected/disconnected the same amount of time. It should be understood that the energy storage devices need not to be connected exactly the same amount of time, but roughly the same amount of time may. For example, over time, e.g. 10 days, or 30 days, or 300 days, no energy storage device has been connected a total time of more than 10%, or more than 5% compared to any other energy storage device in the energy storage system. Thus, over time, the above cycling and alternately connecting and disconnecting of the energy storage device, the energy storage devices may be connected the same number of times, as well as roughly the same amount of time. It should be noted that by using such cycling of the energy storage devices, it does not matter if an individual energy storage device is connected in two subsequent steps of electrically powering the load (i.e. is connected once, and directly thereafter re-connected), or if a certain energy storage device for some reason is temporarily unavailable and not included in the alternatively connecting and disconnecting activities, as over time, such connection inequalities may be evened out, with the result that each energy storage device is connected roughly the same amount of time.

According to at least one example embodiment, the method comprises: remembering which energy storage device that was previously connected for transferring electrical energy from the electrical energy source to the load, upon a subsequent step of electrically powering the load via the electrical energy storage system, connecting another energy storage device for transferring electrical energy from the electrical energy source to the load than the energy storage device previously used.

Hereby, an easy implemented but yet effective means for ensuring that different energy storage devices are connected every time is provided. It should be noted that the step of remembering may be implemented in the previously mentioned cycling of the energy storage devices (i.e. regardless if the different energy storage devices are connected every time or not).

According to at least one example embodiment, during the step of electrically powering the load, only one energy storage device of the energy storage system is connected for transferring electrical energy from the electrical energy source to the load, and any other energy storage devices of the energy storage system is disconnected and is not transferring any electrical energy from the electrical energy source to the load.

Hereby, the overall wear of the energy storage devices can be reduced in an effective manner. By only having one energy storage device connected, the previously mentioned buffer or load buffer is provided, while the wear is minimized or reduced. For example, in the above mentioned example embodiment with three energy storage devices, while one of the first, second and third energy storage devices is connected, the other two are disconnected.

According to at least one example embodiment, the at least one energy storage device connected for transferring electrical energy from the electrical energy source to the load is not charging.

Thus, such energy storage device may be considered at rest. However, according to at least one alternative example embodiment, at least one energy storage device connected for transferring electrical energy from the electrical energy source to the load is charging.

According to at least one example embodiment, the at least one energy storage device disconnected to not transfer any electrical energy from the electrical energy source to the load is not charging.

Thus, such energy storage device may be considered at rest, and is thus disconnected from both the electrical energy source and the load. However, according to at least one alternative example embodiment, at least one energy storage device disconnected to not transfer any electrical energy from the electrical energy source to the load is charging.

Thus, an energy storage device which is not used as buffer or load buffer, may be charged. This provides an efficient use of the downtime of the energy storage devices.

According to at least a second aspect of the invention, a switching arrangement for reducing wear of an energy storage device in an energy storage system connectable to an electrical energy source and to a load, the energy storage system comprising at least two energy storage devices, is provided. The switching arrangement is configured to electrically connect and disconnect each of the energy storage devices to the electrical energy source and/or the load, wherein the switching arrangement is configured to electrically power the load via the energy storage system in such a way that at least one energy storage device is connected for transferring electrical energy from the electrical energy source to the load, and at least one other energy storage device is disconnected and is not transferring any electrical energy.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

That is, the switching arrangement is configured to perform the steps of the method of the first aspect of the invention by connecting at least one of the energy storage devices to transfer electrical energy from the energy source to the load (i.e. that energy storage device being active), and disconnecting at least one other energy storage device to not transfer any electrical energy from the energy source to the load (i.e. that energy storage device being not active or inactive). Hereby, at least one energy storage device is not active during powering of the load, and is thus not subject to any wear.

According to at least one example embodiment, the switching arrangement is configured to alternately connect and disconnect the at least two energy storage devices. The switching arrangement may e.g. comprise at least one contactor for each energy storage device.

Hereby, an easy implemented but yet effective means for ensuring the function to alternately connecting and disconnecting the at least two energy storage devices, thus reducing the overall wear of the energy storage device, is provided.

According to at least one example embodiment, the energy storage system comprises a plurality of energy storage devices, the plurality being more than two, and the switching arrangement is configured to connect the energy storage device which has been disconnected the longest time.

Hereby, an easy implemented but yet effective means for reducing the overall wear of the energy storage devices in an effective manner is provided.

According to at least one example embodiment, the switching arrangement is configured to cycle the energy storage devices in the energy storage system in such a way that over time, each energy storage device is connected for transferring electrical energy from the electrical energy source to the load roughly the same amount of time.

Hereby, an easy implemented but yet effective means for providing the function of cycling the energy storage devices, thus reducing the overall wear of the energy storage devices in an effective manner is provided.

According to at least one example embodiment, the switching arrangement is configured to remember which energy storage device that was previously connected for transferring electrical energy from the energy source to the load, and upon a subsequent action of electrically powering the load via the electrical energy storage system, to connect another energy storage device to transfer electrical energy from the energy source to the load than the energy storage device previously used.

The switching arrangement may e.g. comprise a physical memory, or be communicatively connected to such physical memory. Hereby, an easy implemented but yet effective means for reducing the overall wear of the energy storage devices in an effective manner is provided.

According to at least one example embodiment, the switching arrangement is configured to enable only one energy storage device of the energy storage system to be connected for transferring electrical energy from the electrical energy source to the load, and any other energy storage devices of the energy storage system to be disconnected and thus not transferring any electrical energy from the electrical energy source to the load.

For such purpose, or function, the switching arrangement may e.g. be equipped with a processing unit, processing information concerning which energy storage device to connect, and which to disconnect (e.g. provided by a physical memory). Hereby, the overall wear of the energy storage devices can be reduced in an effective manner.

According to at least a third aspect of the present invention, a power conditioning arrangement is provided. The power conditioning arrangement comprises:

an energy storage system connectable to an electrical energy source, and to a load, the energy storage system comprising at least two energy storage devices, and a switching arrangement according to the first aspect of the invention.

Effects and features of the third aspect of the invention are largely analogous to those described above in connection with the first and second aspects of the invention. Embodiments mentioned in relation to the first and second aspect of the invention, in particular those of the switching arrangement and corresponding activities, are largely compatible with the third aspect of the invention, of which some are exemplified below.

According to at least one example embodiment, the energy storage system comprises a plurality of energy storage devices, the plurality being more than two. Thus, the energy storage system may comprise at least three energy storage devices.

According to at least one example embodiment, the energy storage system comprises an energy source interface, which energy source interface is connectable to the electrical energy source and each one of the energy storage devices. Thus, during use, the energy source interface is active in connecting the electrical energy source with the energy storage devices (whichever is active and/or is charging). Additionality, or alternatively, the energy storage system comprises a load interface, which load interface is connectable to the load and each one of the energy storage devices. Thus, during use, the load interface is active in connecting the energy storage devices (whichever is active) with the load.

According to at least a fourth aspect of the present invention, an electric vehicle is provided. The electric vehicle comprises a switching arrangement according the second aspect of the invention, or a power conditioning arrangement according to the second aspect of the invention.

According to at least a fifth aspect of the present invention, a computer program is provided. The computer program comprising program code means for performing the method of the first aspect of the invention, when the program is run on a computer.

Such computer program may e.g. be implemented in an ECU of the vehicle, or e.g. be comprised in a control unit of the switching arrangement.

According to at least a sixth aspect of the present invention, a computer readable medium carrying a computer program comprising program code means for performing the method of the first aspect of the invention, when the program product is run on a computer, is provided.

According to at least one example embodiment, applicable to any one of the first to sixth aspects of the invention, the energy storage devices are batteries, e.g. batteries adapted for a vehicle, such as e.g. a heavy duty truck.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
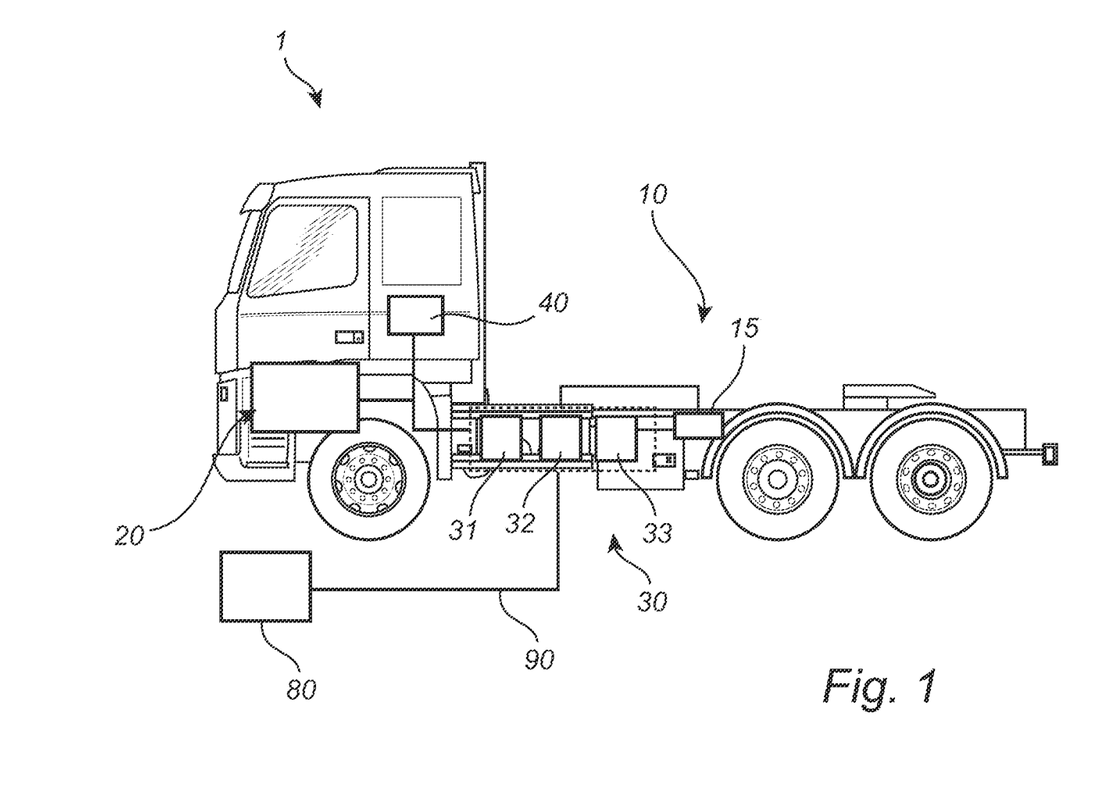
FIG. 1 is a side schematic view of a vehicle in accordance with an example embodiment of the invention.

With reference to FIG. 1, a vehicle 1, here embodied as a heavy duty truck 1, is disclosed for which a method, switching arrangement 15, and/or a power conditioning arrangement 10 of a kind disclosed in the present invention is advantageous. However, the method, switching arrangement 15 or power conditioning arrangement 10 may as well be implemented in other types of vehicles, such as in busses, light-weight trucks, passenger cars, marine applications etc. The vehicle 1 is an electric vehicle, such as a full electric vehicle or a hybrid, comprising at least one electric machine 20, an energy storage system 30 comprising three energy storage devices 31, 32, 33, typically batteries, the energy storage system 30 being arranged and configured to power the electric machine 20. Moreover, the vehicle 1 comprises an auxiliary load 40 arranged and configured for being powered by the energy storage system 30, the auxiliary load 40 being e.g. a heater. Thus, the energy storage system 30 is arranged and configured to supply at least two different loads 20, 40 with electric power, the first load being the electric machine 20, and the second load being the auxiliary load 40. The vehicle 1 typically further comprises other parts of the powertrain such as transmission, drive shafts and wheels (not shown in detail).

As seen in FIG. 1, the energy storage system 30 is connected to an electrical energy source 80 via an energy transfer means 90, typically a cable for transferring electrical energy to the three energy storage devices 31, 32, 33. Hereby, the energy storage devices 31, 32, 33 may be charged with electrical energy. Furthermore, any one of the loads, such as e.g. the auxiliary load 40, may be powered directly via the electrical energy source 80. In this case, the electric energy is preferably transferred via at least one of the energy storage devices 31, 32, 33 in order to provide an improved stability in the system (i.e. a type of buffer or load buffer). This may be achieved by a switching arrangement 15, e.g. by a functionality comprised in a control unit of the switching arrangement 15, as will be described in the following.

Figure 2:
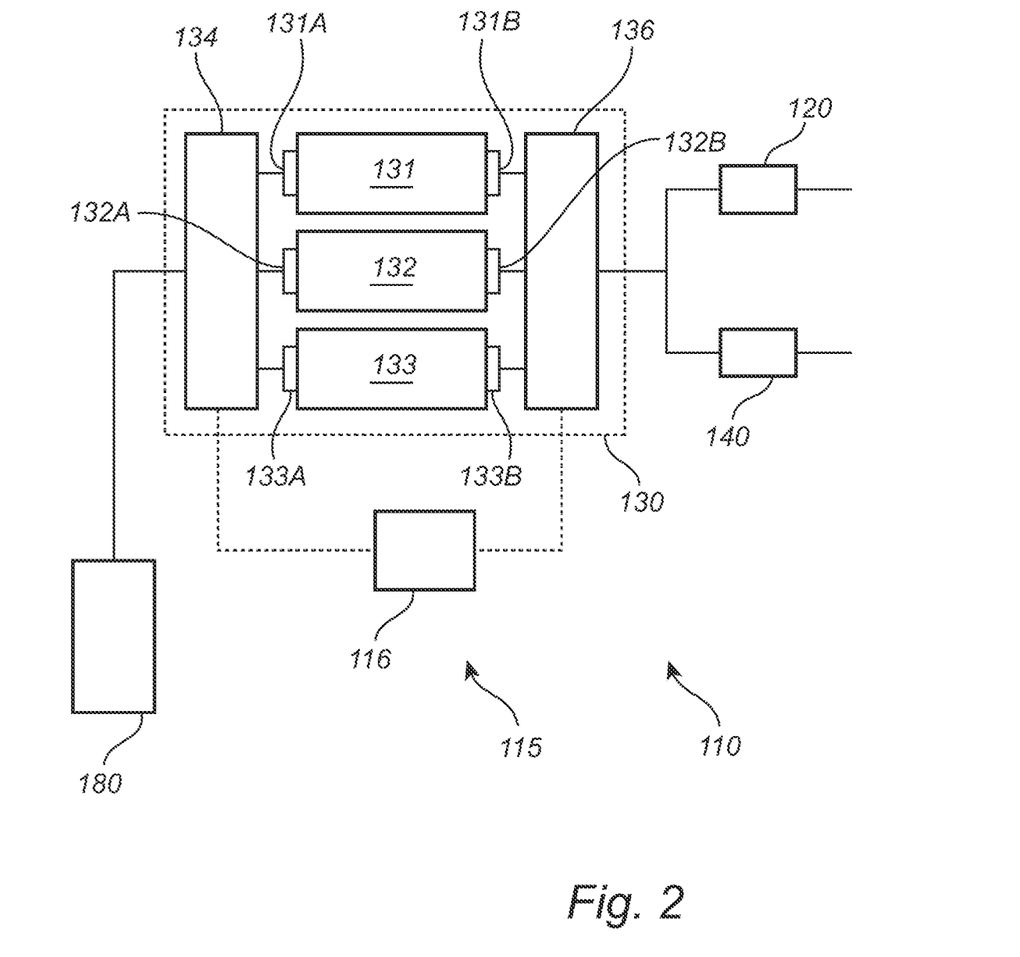
FIG. 2 is a schematic view of a power conditioning arrangement comprising an energy storage system and a switching arrangement in accordance with an example embodiment of the invention.

FIG. 2 is a schematic view of a power conditioning arrangement 110 comprising an energy storage system 130 and a switching arrangement 115. The energy storage system 130 is connected to two loads being e.g. an electric machine 120 and an auxiliary load 140 arranged and configured for being powered by the energy storage system 130, and connected to an electrical energy source 180 supplying electrical energy to the energy storage system 130. Moreover, the energy storage system 130 comprises three energy storage devices 131, 132, 133 arranged in a parallel configuration, an energy source interface 134 providing an interface of the three energy storage devices 131, 132, 133 with the electrical energy source 180, and a load interface 136 providing an interface of the three energy storage devices 131, 132, 133 with each one of the two loads 120, 140. In more detail, each one of the energy storage devices 131, 132, 133 comprises a respective first contactor 131A, 132A, 133A for connection to the energy source interface 134 and the electrical energy source 180, and a respective second contactor 131B, 132B, 133B for connection to the load interface 136 and the loads 120, 140. The contactors 131A, 132A, 133A, 131B, 132B, 133B are only schematically illustrated as boxes in FIG. 2, and may according to at least one example embodiment form for the energy source interface 134, and the load interface 136, respectively. In other words, the first contactors 131A, 132A, 133A may form the energy source interface and the second contactors 131B, 132B, 133B may form the load interface. The contactors 131A, 132A, 133A, 131B, 132B, 133B may e.g. be arcing contactors or circuit breakers or another type of switches.

The switching arrangement 115 comprises a control unit 116, and is arranged and configured to control at least a part of the operation of the energy storage system 130, and is in FIG. 2 schematically illustrated to be connected to the energy source interface 134 and the load interface 136. Hereby, the power conditioning arrangement 110 may e.g. be configured to control charging of any one of the energy storage devices 131, 132, 133, and/or powering of any one of the two loads 120, 140. The power conditioning arrangement 110 is further configured to enable powering of any one of the two loads 120, 140 by the electrical energy source 180, utilizing at least one of the energy storage devices 131, 132, 133 as buffer. In more detail, the switching arrangement 115 is configured to electrically connect and disconnect each one of the energy storage devices 131, 132, 133 to the electrical energy source 180, in FIG. 2 via the energy source interface 134 and the first contactors 131A, 132A, 133A, and/or is configured to electrically connect and disconnect each of the energy storage devices 131, 132, 133 to any one of the two loads 120, 140, in FIG. 2 via the load interface 136 and the second contactors 131B, 132B, 133B. Moreover, the switching arrangement 115 is configured to electrically power any one of the two loads 120, 140 via the electrical energy storage system 130 in such a way that at least one energy storage device 131, 132, 133 is connected for transferring electrical energy from the electrical energy source 180 to the particular load(s) 120, 140, and at least one other energy storage device 131, 132, 133 is disconnected and is not transferring any electrical energy. For example, a first energy storage device 131 is connected to the electrical energy source 180 via the energy source interface 134 and the first contactor 131A, and is connected to the particular load(s) 120, 140, e.g. the auxiliary load 140, via the load interface 136 and the second contactor 131B. Furthermore, second and third energy storage devices 132, 133 are disconnected from the electrical energy source 180 and/or the two loads 120, 140. That is, the respective first contactors 132A, 133A and second contactors 132B, 133B are inactive in transferring any electrical energy from the electrical energy source 180 to any one of the two loads 120, 140. Hereby, wear at least by means of contactor wear is reduced for the disconnected energy storage devices.

Preferably, the switching arrangement 115 is configured to alternately connect and disconnect the energy storage devices 131, 132, 133 of the energy storage system 130. Hereby, the at least one energy storage device 131, 132, 133 which is inactive and thus not subject to any wear, such as e.g. contactor wear, is subsequently connected, and used as buffer, as one of the two loads 120, 140 is powered by the electrical energy source 180. Thus, the switching arrangement 115 may cycle the energy storage devices 131, 132, 133 in the energy storage system 130 in such a way that over time, each energy storage device 131, 132, 133 is connected for transferring electrical energy from the energy source 180 to the load(s) 120, 140 roughly the same amount of time. Furthermore, the switching arrangement 115 may be configured to connect the energy storage device 131, 132, 133 which has been disconnected the longest time. For such operation, the switching arrangement 115 is typically configured to remember which one of the energy storage devices 131, 132, 133 that was previously connected for transferring electrical energy from the electrical energy source 180 to the load(s) 120, 140, and upon a subsequent action of electrically powering the load(s) 120, 140 via the energy storage system 130, to connect another one of the energy storage devices 131, 132, 133 to transfer electrical energy from the electrical energy source 180 to the load(s) 120, 140 than the energy storage device 131, 132, 133 which was just recently used. Hereby, the overall wear of the energy storage devices 131, 132, 133, such as e.g. contactor wear, can be minimized. Preferably, only one energy storage device 131 of the energy storage system 130 is connected at a time for transferring electrical energy from the electrical energy source 180 to the load(s) 120, 140, and any other energy storage devices 132, 133 of the energy storage system 130 is disconnected and thus not transferring any electrical energy from the electrical energy source 180 to the load(s) 120, 140, as the buffer of only one of the energy storage devices 131, 132, 133 is typically enough.

Figure 3:
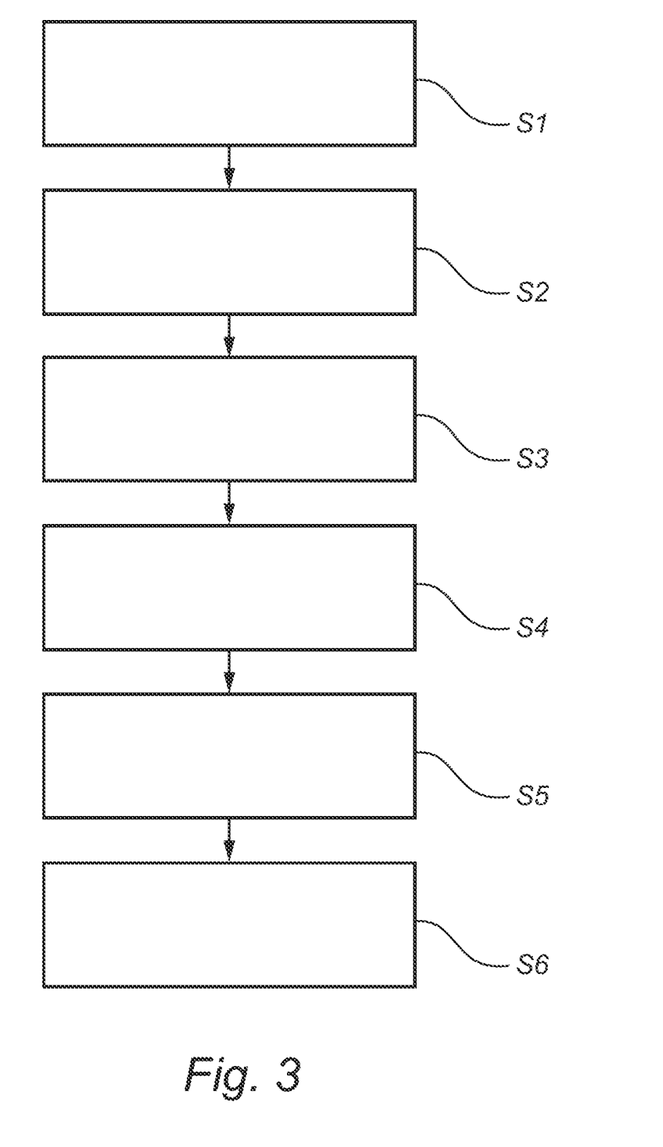
FIG. 3 is a flowchart illustrating the steps of a method in accordance with example embodiments of the invention.

The operation of the energy storage system 30, 130 of FIG. 1 and FIG. 2 will now be described in more general terms with additional reference to FIGS. 3 and 4. The energy storage system 30, 130 comprises at least two energy storage devices 31, 32, 33, 131, 132, 133, and is connectable to a load, such as e.g. any one of the loads exemplified in FIG. 1 and FIG. 2 (electric machine 20, 120 and/or auxiliary load 40, 140).

In a step S1, the energy storage system is connected to an electrical energy source. The connection is preferably established by an electrical cable, but may as well be established by a wireless connection, such as e.g. inductive transfer of electrical energy. By stating that the energy storage system is connected to the electrical energy source, at least one of the energy storage devices is connected to the electrical energy source.

In a step S2, the load is electrically powered by the connected electrical energy source via the electrical energy storage system by connecting at least one of the energy storage devices. Hereby electrical energy is transferred from the electrical energy source to the load, suing the at least one energy storage device as buffer. Moreover, in step S2, at least one other energy storage device is disconnected to not transfer any electrical energy from the electrical energy source to the load. The disconnection of at least one other energy storage device may be passive (i.e. if the particular energy storage device is disconnected by default, it is simply not connected as the load is electrically powered, or if it is connected by default, it is disconnected to disable the functionality of transferring electrical energy therethrough). The connection of the at least one of the energy storage devices may be carried out prior to, simultaneously, or subsequent to the disconnection of at least one other energy storage device. In order to minimize the wear of the energy storage devices, preferably only one energy storage device of the energy storage system is connected for transferring electrical energy from the energy source to the load, and any other energy storage devices of the energy storage system is disconnected and is not transferring any electrical energy from the energy source to the load.

In a step S3, the connecting and disconnecting of the at least two energy storage devices are carried out alternatingly. This may be performed by means of the switching arrangement 115 as described with reference to FIG. 2.

In a step S4, the energy storage device which has been disconnected the longest time is connected for acting as buffer as previously described. Thus, step S4 may be combined with the step S3.

In a step S5, which may be combined with the steps S3 and/or S4, the energy storage devices in the energy storage system are cycled in such a way that over time, each energy storage device is connected for transferring electrical energy from the energy source to the load roughly the same amount of time. It should however be noted, that when utilizing the cycling of the energy storage devices in step S5, step S4 may be omitted, as sometimes another energy storage device than the one being disconnected the longest time, may be connected. However, over time, and by utilizing the cycling, each energy storage device will be connected roughly the same time.

In a step S6, which may carried out in parallel to any one of steps S2, S3, S4 and S5, which energy storage device that was previously connected for transferring electrical energy from the energy source to the load is remembered, and upon a subsequent step of electrically powering the load via the electrical energy storage system (step S2), another energy storage device for transferring electrical energy from the energy source to the load than the energy storage device previously used, is connected. This information is preferably stored in a physical memory. As mentioned previously, the memory, and step of memorizing which of the energy storage that was previously connected, may be utilized also for the cycling of the energy storage devices in step S5. In such case, the time which each of the energy storage devices has been connected may be stored in the memory.

It should be understood that any energy storage device(s) which is disconnected, is primary disconnected from electrically powering the load, but may be connected to the electrical energy source for e.g. charging. However, according to at least one example embodiment, any energy storage device(s) which is disconnected, is disconnected from the electrical energy source.

It should be noted that the naming of the steps not necessarily, but might according to at least one example embodiment, relate to the order in which the steps are carried out. Thus, the order of the steps may be different than that explained here, and the switching arrangement of FIG. 2 may be configured to carry out one or several of the steps. Moreover, one or more of the steps may be combined and carried out simultaneously.

It should be noted that the power conditioning arrangement 110 of FIG. 2 may be implemented as the power conditioning arrangement 10 in vehicle 1 of FIG. 1. Moreover, the switching arrangement 115 may be implemented as the switching arrangement 15 in vehicle 1 of FIG. 1, and may comprise a control unit, or be at least partly comprised in a control unit, such as a central control unit. The switching arrangement, or any related control unit, may comprise a computer program comprising program code means for performing at least some of the method described with reference to FIG. 3

Figure 4:
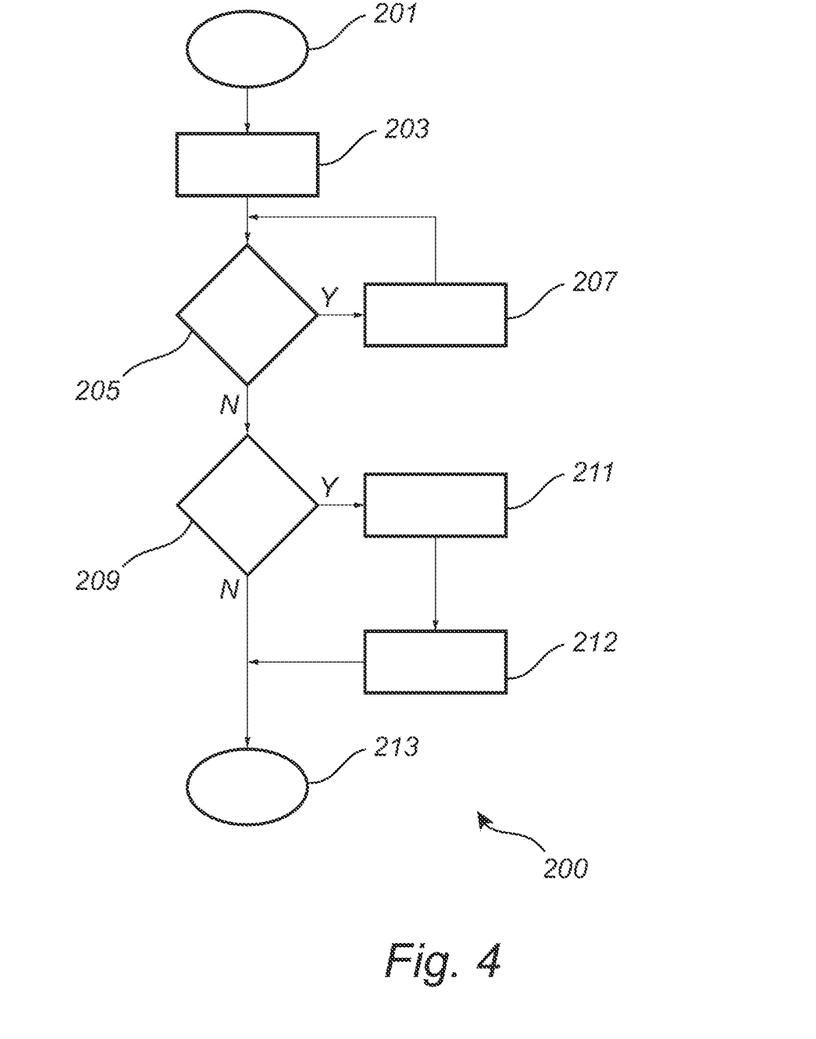
FIG. 4 is yet another flowchart illustrating the steps of a method in accordance with example embodiments of the invention.

FIG. 4 is schematic flow-chart describing an example operation sequence 200 with various possibilities of the energy storage system 30, 130 of FIG. 1 and FIG. 2, e.g.

using the power conditioning arrangement 110 and switching arrangement 115 of FIG. 2, or a control unit as described above.

Upon initiation 201 of the sequence 200, the energy storage system is connected 203 to an electrical energy source as described with reference to step S1 and FIG. 3. Subsequently, it is determined if any one of the energy storage devices is in need of charging, symbolized by first determination box 205. If charging is needed (Y=Yes), the energy storage device(s) in need of charging is charged 207. If no charging is need (N=No) or when charging is completed, the sequence 200 continues to determine if a load, such as an auxiliary load 40, 140 of FIGS. 1 and 2, is in need of powering, e.g. in order to be charged, symbolized by second determination box 209. If powering of the load is needed (Y=Yes), the load is electrically powered 211 by at least one connected electrical energy source via the electrical energy storage system as described with reference to step S2 and FIG. 3. If no load is in need of powering (N=No), the sequence 200 continues to stop or going to sleep 213. In case the load is electrically powered 211, the energy storage device that was connected for powering 211 the load is remembered (step S6 of FIG. 3), before stopping or going to sleep 213. Thus, upon a subsequent step of powering the load via the electrical energy storage system (Step S2 of FIG. 3), another energy storage device for transferring electrical energy from the electrical energy source to the load than the energy storage device previously used in 211, is connected. Thus, the cycling and alternating connection/disconnection as described with reference to steps S3, S4 and S5 of FIG. 3 may be achieved.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for reducing contactor wear of an energy storage device in an energy storage system connected to a load, the energy storage system comprising at least two energy storage devices, the method comprising:
connecting the energy storage system to an electrical energy source,
electrically powering the load by electrical energy from the electrical energy source via the energy storage system by connecting at least one of the energy storage devices to directly transfer electrical energy from the electrical energy source to the load and thereby using the connected energy storage device as a buffer or load buffer in the direct transfer of the electrical energy from the electrical energy source to the load, and disconnecting at least one other energy storage device to not transfer any electrical energy from the electrical energy source to the load, such that the electrical energy source is directly electrically powering the load via the energy storage system such that at the same time at least one energy storage device of the energy storage system is active and used as buffer or load buffer in the energy storage system, and at least one energy storage device of the energy storage system is inactive, and not subject to any contactor wear, and
cycling the energy storage devices in the energy storage system in such a way that over a period of time no energy storage device is connected for transferring electrical energy from the electrical energy source to the load for a total time of more than 10% compared to any other energy storage device in the energy storage system.

2. The method according to claim 1, comprising: alternately connecting and disconnecting the at least two energy storage devices.

3. The method according to claim 1, wherein the energy storage system comprises a plurality of energy storage devices, the plurality being more than two, and the method comprises: connecting the energy storage device which has been disconnected the longest time.

4. The method according to claim 1, comprising: remembering which energy storage device that was previously connected for transferring electrical energy from the electrical energy source to the load, upon a subsequent step of electrically powering the load via the electrical energy storage system, connecting another energy storage device for transferring electrical energy from the electrical energy source to the load than the energy storage device previously used.

5. The method according to claim 1, wherein during electrically powering the load, only one energy storage device of the energy storage system is connected for transferring electrical energy from the electrical energy source to the load, and any other energy storage devices of the energy storage system is disconnected and is not transferring any electrical energy from the electrical energy source to the load.

6. The method according to claim 1, wherein the at least one energy storage device connected for transferring electrical energy from the electrical energy source to the load is not charging.

7. A switching arrangement for reducing contactor wear of an energy storage device in an energy storage system connectable to an electrical energy source and to a load, the energy storage system comprising at least two energy storage devices, the switching arrangement being configured to electrically connect and disconnect each of the energy storage devices to the electrical energy source and/or the load, wherein the switching arrangement is configured to electrically power the load by electrical energy from the electrical energy source via the energy storage system in such a way that at least one energy storage device is connected for transferring electrical energy directly from the electrical energy source to the load and thereby using the connected energy storage device as a buffer or load buffer in the direct transfer of the electrical energy from the electrical energy source to the load, and at least one other energy storage device is disconnected and is not transferring any electrical energy, such that the electrical energy source is directly electrically powering the load via the energy storage system in such a way that at the same time at least one energy storage device of the energy storage system is active and used as buffer or load buffer in the energy storage system, and at least one energy storage device of the energy storage system is inactive, and thus not subject to any contactor wear, and
to cycle the energy storage devices in the energy storage system in such a way that over a period of time no energy storage device is connected for transferring electrical energy from the electrical energy source to the load for a total time of more than 10% compared to any other energy storage device in the energy storage system.

8. The switching arrangement according to claim 7, being configured to alternately connect and disconnect the at least two energy storage devices.

9. The switching arrangement according to claim 7, wherein, the energy storage system comprises a plurality of energy storage devices, the plurality being more than two, and wherein the switching arrangement is configured to connect the energy storage device which has been disconnected the longest time.

10. The switching arrangement according to claim 7, being configured to remember which energy storage device that was previously connected for transferring electrical energy from the energy source to the load, and upon a subsequent action of electrically powering the load via the electrical energy storage system, to connect another energy storage device to transfer electrical energy from the energy source to the load than the energy storage device previously used.

11. The switching arrangement according to claim 7, being configured to enable only one energy storage device of the energy storage system to be connected for transferring electrical energy from the electrical energy source to the load, and any other energy storage devices of the energy storage system to be disconnected and thus not transferring any electrical energy from the electrical energy source to the load.

12. A power conditioning arrangement comprising: an energy storage system connectable to an electrical energy source and to a load, the energy storage system comprising at least two energy storage devices, and a switching arrangement according to claim 7.

13. An electric vehicle comprising switching arrangement according to claim 7.

14. The method according to claim 1, wherein over the period of time, no energy storage device is connected for transferring electrical energy from the electrical energy source to the load for a total time of more than 5% compared to any other energy storage device in the energy storage system.

15. The method according to claim 1, wherein over the period of time, the energy storage devices are connected the same number of times.

16. The method according to claim 1, wherein an individual one of the energy storage devices is connected in two subsequent steps of electrically powering the load.

17. The method according to claim 1, wherein the period of time is greater than 10 days.

18. The method according to claim 7, wherein over the period of time, no energy storage device is connected for transferring electrical energy from the electrical energy source to the load for a total time of more than 5% compared to any other energy storage device in the energy storage system.

19. The method according to claim 7, wherein over the period of time, the energy storage devices are connected the same number of times.

20. The method according to claim 7, wherein the period of time is greater than 10 days.

* * * * *